(12) United States Patent
Bremer et al.

(10) Patent No.: US 6,553,002 B1
(45) Date of Patent: Apr. 22, 2003

(54) APPARATUS AND METHOD FOR ROUTING DATA PACKETS THROUGH A COMMUNICATIONS NETWORK

(75) Inventors: Clark Bremer, Saint Louis Park, MN (US); Marlon Gunderson, St. Paul, MN (US); Christine E. Severns, Minneapolis, MN (US)

(73) Assignee: Ascend Communications, Inc., Westford, MA (US)

( * ) Notice: Subject to any disclaimer, the term of this patent is extended or adjusted under 35 U.S.C. 154(b) by 0 days.

(21) Appl. No.: 08/921,189

(22) Filed: Aug. 29, 1997

(51) Int. Cl.⁷ .............................................. H04L 12/28
(52) U.S. Cl. ...................................... 370/254; 370/351
(58) Field of Search ................................. 370/400, 392, 370/408, 351, 254, 255, 256, 389, 401, 404

(56) References Cited

U.S. PATENT DOCUMENTS

| | | | |
|---|---|---|---|
| 4,933,846 A | 6/1990 | Humphrey et al. ......... 364/200 |
| 5,353,283 A | * 10/1994 | Tsuchiya ..................... 370/60 |
| 5,463,777 A | * 10/1995 | Bialkowski et al. ......... 395/600 |
| 5,546,390 A | 8/1996 | Stone .......................... 370/60 |
| 5,598,410 A | 1/1997 | Stone ......................... 370/469 |
| 5,787,430 A | * 7/1998 | Doeringer et al. .......... 707/100 |

* cited by examiner

Primary Examiner—Valencia Martin-Wallace
Assistant Examiner—Kim T. Nguyen

(57) ABSTRACT

A method and apparatus for determining the next router that a data packet is transmitted to on its way to a destination host by traversing a routing table using a hardware search engine and a unique search tree. The step of traversing each node in the search tree takes only one memory cycle, decreasing in half the time it takes to search a routing table and thus forward data packets on a system of computer networks. This is accomplished by storing the decision bit for each node in its parent node rather than in the node itself The apparatus may use a hardware search engine to search the routing table.

16 Claims, 11 Drawing Sheets

| 31 | 30 | 10 | 9 | 8 | 7 | 0 |
|---|---|---|---|---|---|---|
| ar | node_index | | lf | np | bit_position | |

| Child | 31 | 30 | 10 | 9 | 8 | 7 | 0 |
|---|---|---|---|---|---|---|---|
| right(adrs) | ar | node_index | | lf | np | bit_position | |
| left(adrs+1) | ar | node_index | | lf | np | bit_position | |

| 31 | 23 | 22 | 20 | 19 | 0 |
|---|---|---|---|---|---|
| mask length | | flags | | nexthop_index_handle | |
| prefix (most significant word) | | | | | |

| Child | 31 | 30 | 10 | 9 | 8 | 7 | 0 | |
|---|---|---|---|---|---|---|---|---|
| right(adrs) | ar | node_index | | lf | np | bit_position | | 126 |
| left(adrs+1) | ar | node_index | | lf | np | bit_position | | 127 |
| (adrs+2) | mask length | flags | nexthop_index_handle | | | | | 128 |
| (adrs+3) | prefix (most significant word) | | | | | | | |

APPARATUS AND METHOD FOR ROUTING DATA PACKETS THROUGH A COMMUNICATIONS NETWORK

BACKGROUND OF THE INVENTION

This invention relates generally to data communications systems, and more particularly to an apparatus and method for routing data packets through a communications system.

In most networks, data at one location cannot be directly sent to another location without passing through multiple network nodes. For example, a telephone or data communications system may not provide a direct connection between a source node in California and a destination node in Sweden. Instead, a path that may pass through a number of data routers must be determined to establish a connection between the two locations. A routing table may store information at each router about the next routers in the path, correlating a destination number or address with the next router in the path. At each intermediate node location on the path, the routing table is examined to determine the next node on the path. And in each case only the next node in the path is generally stored, since the alternative of storing the entire sequence of nodes for each of the multiple possible paths through the network for all nodes in the network would require a large amount of memory. Using these routing tables located at each node in the network, data may be routed from a source to a destination by hopping between various nodes. Routing at nodes in a computer network is accomplished by routers.

The time spent examining each routing table at each node translates into delays, for example, in establishing a connection between one caller and another, or in transferring data from one computer to another computer. Since each router in a data path must search its own routing table to determine the next location in the path, this delay is multiplied by the number of routers along the path of the data. On systems as complex as the Internet, where approximately 100,000 networks connect 10 million computers, and where a data packet may be sent through dozens of routers, the time spent examining routing tables can cause considerable delays. In addition, on a network like the Internet, which is expected to grow and support 500,000 networks and 50 million computers within a few years, the delays associated with the route table look-ups are likely to increase dramatically.

These route table look-up delays and an attempt to do less than a full route table look-up can cause significant problems. Each router in a network may have a predetermined amount of memory available to store data packets (e.g., a queue) while the route table look-up process occurs since the route table look-up may not occur as fast as data packets are entering the router. A very slow route table look-up process may cause the memory to overflow because there are too many data packets waiting for the route table look-up process. This queue memory overflow may cause data packets to be lost or discarded which requires those data packets to be resent.

Some conventional routers use software-implemented search engines to determine the next location in a path. The routers use a microprocessor to receive data packets from remote locations, to process the data packet header, to search the routing tables for the next location along the path, and to perform other functions. These microprocessors may execute specific search algorithms intended to perform the search faster than other methods. Although, these software implemented search algorithms decrease route table search times, these software implemented algorithms are still too slow to handle the anticipated growth of the Internet. In addition, the microprocessor may be tied up while performing the route table search and thus cannot perform other tasks while this search is taking place.

Other conventional routers use a cache memory to store only a portion of a full routing table in an effort to decrease the time needed to search through the routing table. These systems generally require less memory to store a routing table, and because there is less information in the abbreviated routing table to process, it potentially takes less time to examine these cache-based routing tables. However, these cache-based systems have proven inefficient because there are so many different data paths on a network, such as the Internet, that entries in the routing table corresponding to the desired path are found in the cache only a fraction of the time. In addition, infrequently-used entries are rarely found in the abbreviated routing table, since conventional methods used to maintain these cache-based routing tables remove infrequently used paths in favor of entries for paths that are more often or more recently used. When an entry is not found in the cache, it must be fetched from memory, adding to the delays in determining a next location in the path.

For the above reasons, there is need to quickly determine next addresses in a path using a full routing table which avoids the above problems with conventional systems, and it is to this end that the present invention is directed.

SUMMARY OF THE INVENTION

The invention provides an apparatus and method for rapidly routing data packets through a communications network and for rapidly traversing a routing table in a router to determine a next router in a path of a data packet as it moves towards a destination computer. The routing table may be stored as a binary tree in a router's memory. The nodes of the binary tree may correspond to bits in the destination address, and the leaves may correspond to the physical address of a next router on the path. The next router in a path is determined by traversing the binary tree and reading a router address stored in a leaf node. In one aspect of the present invention the system and method use a particular unique data structure for the nodes and leaves in the binary tree so that only a single memory cycle is required to traverse each node. This may be accomplished by storing, in each node, a decision bit for its child, i.e., path to the next node in the binary tree, which determines whether the right branch or the left branch is taken from the child.

In another aspect of the invention, the apparatus used to traverse the routing table uses a dedicated hardware search engine to perform the search. By using a dedicated hardware search engine, the apparatus allows the main microprocessor in the router to perform other tasks while the hardware search engine is performing the route table search.

In accordance with the invention, a master microprocessor is used to control a hardware search engine that it used to traverse a routing table stored as a search tree, also known as a search trie, to produce the address of a router in path to which a data packet is to be sent. The search tree or trie may be a compressed special radix tree or a Patricia tree. The master microprocessor communicates data about the radix tree to the hardware search engine and can then go about performing other tasks while the hardware search engine traverses the radix tree in the background. The hardware search engine traverses each node in the radix tree in one memory cycle because of a unique data structure used to store each node of the radix tree. The decision bit for each node is stored in its parent node, so that when a node is traversed, the decision of which child node to branch to next has already been determined, and thus only one memory cycle is needed to traverse each node. The leaves of the radix tree store information about a next router that the data packet may be sent to. When a leaf is reached, the physical address of the next router may be determined and the data packet sent to the next router on its way to a destination address.

BRIEF DESCRIPTION OF THE DRAWINGS

FIGS. 10–13 are diagrams of data structures that are used to store information in nodes and leaves of the search tree in accordance with the present invention;

DETAILED DESCRIPTION OF A PREFERRED EMBODIMENT

The invention is particularly applicable to the routing of data packets along a system of interconnected computer networks, such as the Internet, and it is in this context that the invention will be described. It will be appreciated, however, from the description which follows that the invention has broader utility to other data routing systems.

Figure 1:
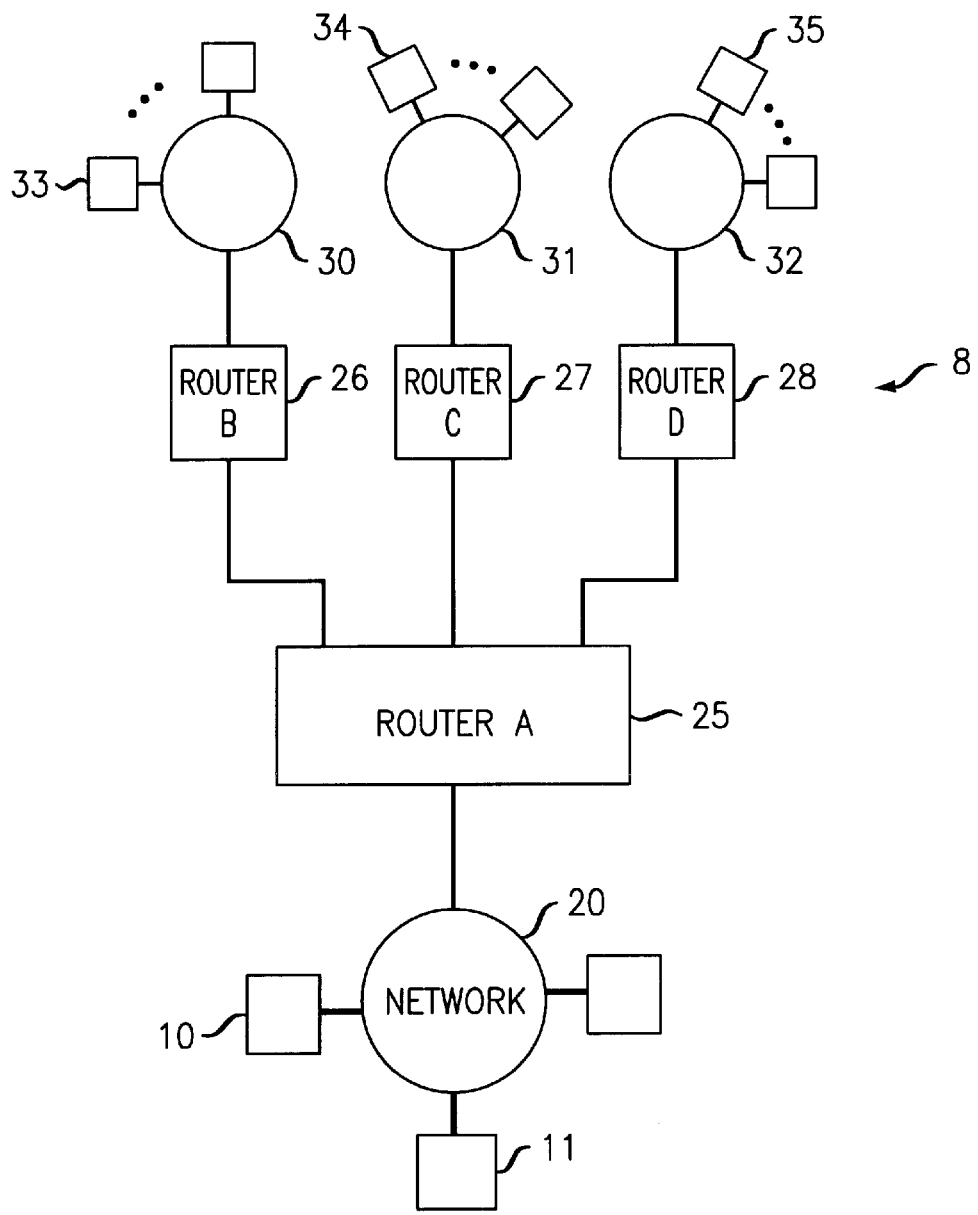
FIG. 1 is a drawing of a communications system having a system of networks attached by routers and host computers on each network.

FIG. 1 illustrates a computer network that uses routers to transmit a data packet from one computer (a source host 10) to another computer (a destination host 11). The source host 10 may be connected to a network 20. Source host 10 may communicate directly with destination host 11 because they are on the same network. However, if the source host wishes to transmit a data packet to a destination host on a different network, a route through one or more routers must be determined. In this example source host may first send the data packet to a router 25, which in turn can route the data packet to its destination. For example, if source host 10 wishes to send a data packet to destination host 33 on a network 30, source host 10 formats the data packet to contain the address (the destination address) of the destination host 33. The source host 10 will then transmit the data to router A 25, which will use a routing table stored in its memory to determine the route that may be taken by the data packet through the communications network. The routing of the data packets is described below. By comparing the destination address to a network address, source 10 determines that destination host is not on network 10 and that the data packet must be forwarded to router A 25. Router A, using its own route table, may then determine that for the data packet to reach destination host 33, the data packet must be forwarded to router B 26, which, as discussed below, may be connected to a port on router A. Router B in turn will use the destination address and a routing table stored in its memory to determine that destination host 33 is on network 30, and router B places the data packet on network 30 to be sent to the destination host 33. If, for example, the data packet was to be transmitted to a destination host 34 on a different network 31, the routing table in router A would determine that the data packet should be sent to router C 27, which may be connected to another port on router A. Thus, on this simple system of networks, a routing table must be accessed twice to determine the next router to which the data packet is to be forwarded. When data packets are routed in more complex networks, they may pass through dozens of routers with corresponding route table delays in each router.

The entries in a routing table may be initialized and updated in a variety of ways, including static routing and dynamic routing. During static routing, a system administrator for a network may add known routes into the route table. During dynamic routing, also known as peering, a dynamic routing protocol software application running on a router may query neighboring routers to exchange routing table information. The other routers in turn may send out queries and other information of their own. When the results of these queries are returned to the router, it may determine the destinations that it may sent data packets to and the next router on the path to that destination. In addition, the router can update its entries in the route table to reflect routers that can more efficiently forward data packets due to bottlenecks or congestion at routers on the router's current path. Now, a router that routes data packets through a network will be described in more detail.

Figure 2:
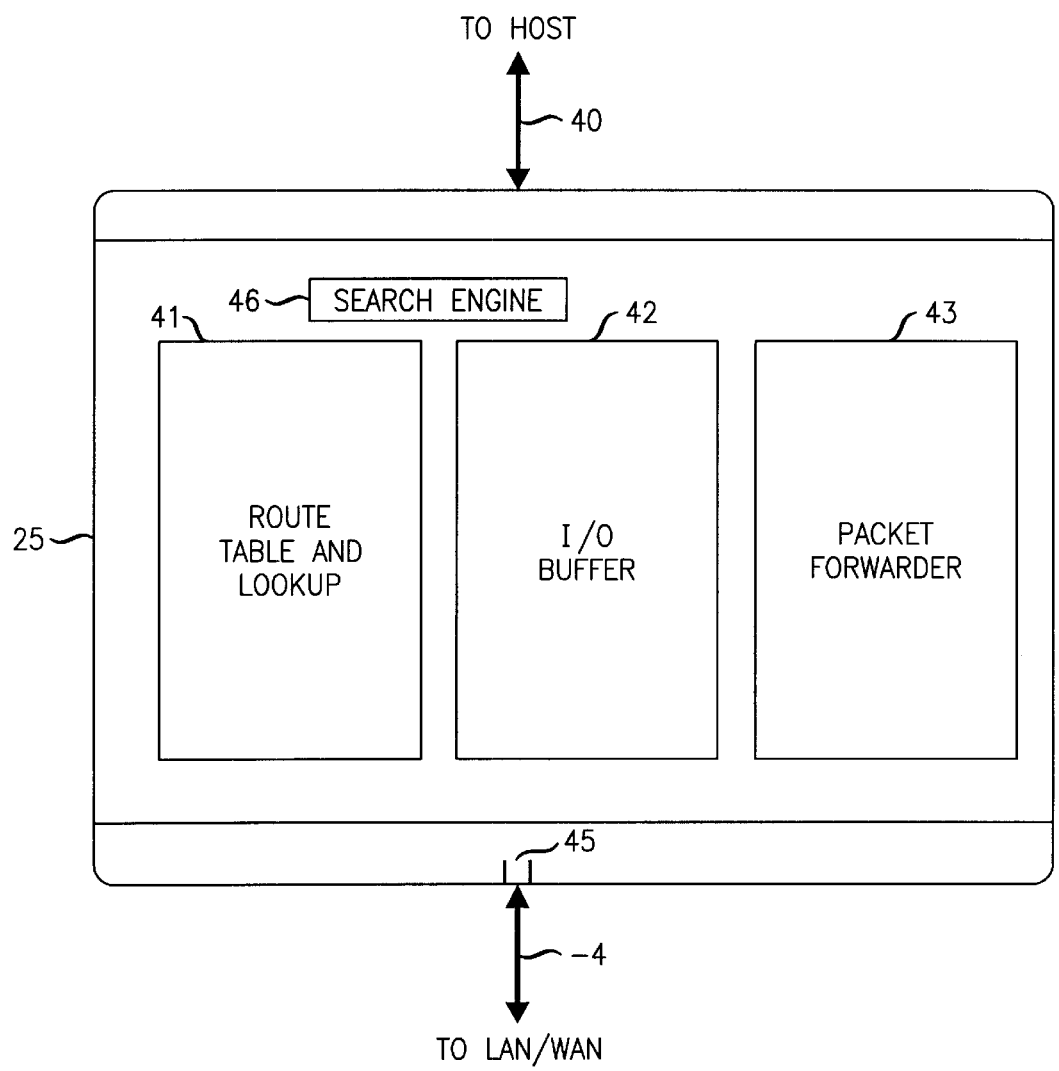
FIG. 2 is a diagram showing more details of the router as shown in FIG. 1.

FIG. 2 is a more detailed diagram of the router 25 of FIG. 1. The elements in FIG. 2 will be discussed in connection with a data packet being received by the router 25 and transmitted to another router on the path. A data packet containing the destination address may be received by the router on a transmission cable 40. The data packet may be stored in an I/O buffer 42 for processing. A hardware search engine 46 that may be a microprocessor that executes a program in memory, will search a routing table stored in a memory portion of the route table and lookup 41. Using the routing table and a search tree, the hardware search engine will determine the next router that the data packet is sent to on its way to the destination host. The route table look-up may also be conducted by a software search application being executed by a microprocessor (not shown) which is separate from the hardware search engine. The router may have several ports connected to other routers, so the search engine must also determine a port 45 on the router that the appropriate next router is connected to. A packet forwarder 43 may then transmit the data packet to that port and thus on to the next router along a cable 44. The search engine may then erase the data packet from the I/O buffer. A discussion of a hardware implementation, in accordance with the present invention, of a router to determine a route on a path will be described.

Figure 3:
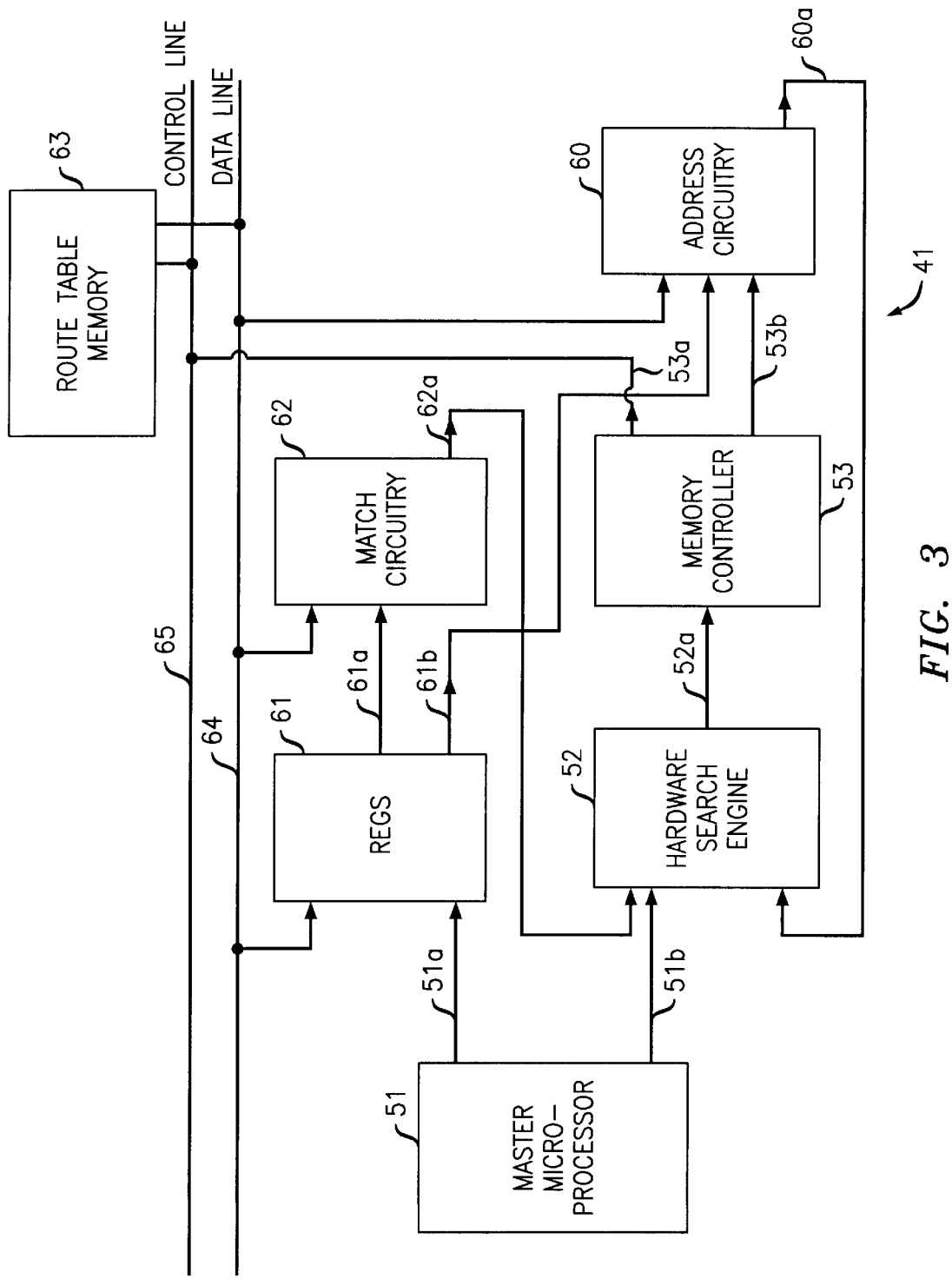
FIG. 3 is a block diagram of the router of FIG. 2 in accordance with the present invention.

FIG. 3 is a block diagram of an embodiment of the route table and lookup 41 shown in FIG. 2 in accordance with the present invention. The route table and lookup 41 may include master microprocessor 51 and a hardware search engine 52. The hardware search engine may traverse (e.g. searches through) a routing table stored as a search tree (e.g., a compressed special radix tree or a Patricia tree), which are discussed in more detail below, to determine a next router to which a data packet may be sent. The hardware search engine is a piece of hardware that performs route table searching and is controlled by the master microprocessor 51. In addition, the traversing of the route table and the search tree may also be conducted by a software search application being executed by the master microprocessor. The master microprocessor may perform such functions as storing data that is used by the hardware search engine and servicing any interrupts that may occur. The master microprocessor may also perform further processing of the header portion of a data packet while the hardware search engine is performing its search which significantly reduces the route table look-up time delay associated with a router using a hardware search engine in accordance with the invention. Thus, the master microprocessor may perform other operations while the hardware search engine performs a route table search. The master microprocessor may store, in a set of registers 61, the head node of a search tree, that may be a special compressed radix tree or a Patricia tree, or a destination address, so that the hardware search engine can begin searching the search tree. The search tree in accordance with the invention will be described below. In accordance with the present invention, the hardware search engine can advantageously traverse each node in the search tree in a single memory cycle due to the unique structure of the search tree, requiring approximately 50% less time than previous route table search apparatus and methods.

In addition, the hardware search engine may store the results of a route table search in the set of registers 61, indicating whether a router that can forward the data packet to its final destination was found, or whether an error occurred during the search. The hardware search engine may also communicate with a memory controller 53 that controls access to data in the registers or the nodes in a search tree which may be stored in a route table memory 63. The addressing of data in the route table memory 63 may further be controlled by address circuitry 60. During a route table search, the head node of the search tree and the search key may be provided to the hardware search engine and then, as the search tree is traversed, each other node may be retrieved from the route table memory and processed by the hardware search engine. In this manner, the search tree is traversed by the hardware search engine to determine a next router to which a data packet is sent. A hardware match circuit 62 may be used to determine whether the result of a tree search has produced a best match route. In the event that a best route is not found by the hardware search engine, there may be one or more default routes stored in the router and the data packet may be sent along one of the default routes. In accordance with the invention, the traversal of the search tree may occur entirely using hardware circuitry which increases the overall speed of the route table search.

The operation of the circuit of FIG. 3 will now be described in relation to a data packet being forwarded by the router 25 in FIG. 1. The data packet is received and stored in the input/output buffer 42 of the router shown in FIG. 2. The master microprocessor 51 stores the destination address of the data packet, which is located within a portion of the header of the data packet, in the set of registers 61 and sends a signal to the hardware search engine 52 to begin searching a radix tree for a next router to which to send the data packet.

The hardware search engine may then send a command to the address circuitry 60 to retrieve the data at the head node of the radix tree. The hardware search engine retrieves a node and determines the node in the tree to branch to and the address of that node in one memory cycle. The hardware search engine may then send a command to the memory controller 53 to fetch the next node from memory and store it in, for example, a current node register that may be stored in the address circuitry. The hardware search engine again processes the next node to determine the next child node to process and the address of that node in a single memory cycle. This continues until the hardware search engine encounters a leaf, which may store the physical address of a router in the path. It then transmits the leaf data to the match circuitry 62 to determine whether the leaf does store a valid route (e.g., the data packet can reach its destination if it is forwarded to the router address at the leaf). The results of this determination are transmitted back to the hardware search engine. To better understand the search process, the structure of the information in a data packet will now be described.

Figure 4:
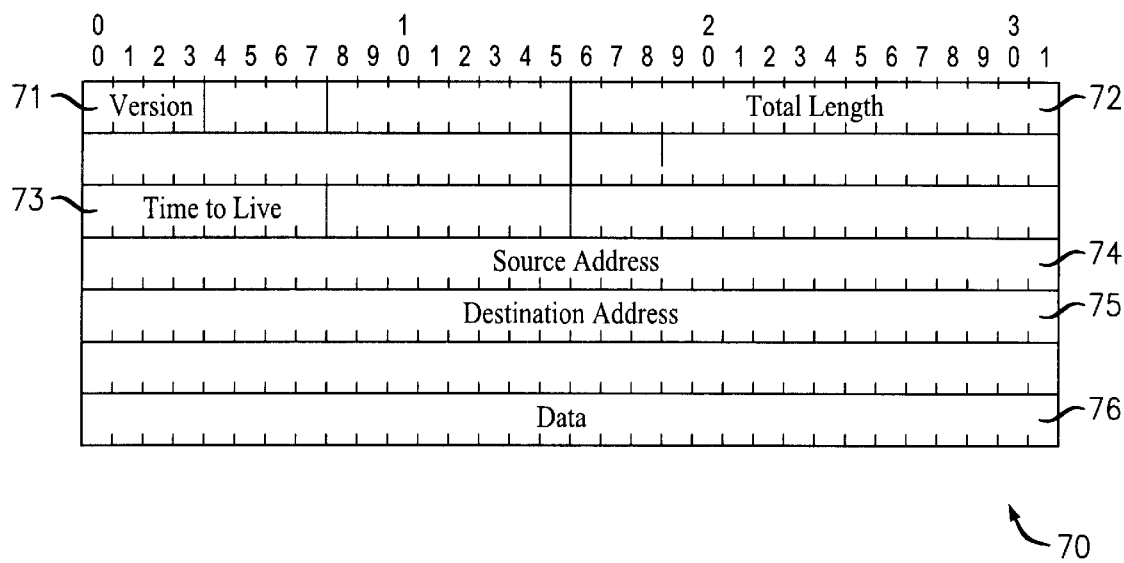
FIG. 4 is a data structure for a data packet transmitted along the Internet using the Internet Protocol version 4.

FIG. 4 shows some of the relevant fields in a data packet 70 formatted according to the Internet Protocol (IP) version 4 (IPv4) protocol. The IPv4 protocol is a protocol that determines, among other things, a standard data format that is recognized by all systems on the Internet so that a router on the Internet must be able to process a data packet having this format.

The data packet contains header portions 71–75 and a data portion 76 that stores the actual data within the data packet. The header contains a version field 71, which indicates how the data was stored and thus how it will be parsed. If, for example, this field contains "4", the header will be parsed as an IPv4 datagram, which contains the fields listed in FIG. 4. Otherwise the header will be parsed as if it had been formatted for another protocol, such as the IPv6 protocol. A length field 102 stores a value equal to the total length of the data packet, including the header and the message. A Time To Live field 73 stores a value that indicates how long the data packet can survive on the Internet before being discarded. Under IPv4, this number determines how many routers a data packet can visit before it is discarded. In other systems, the field may contain a time within which the data packet must be delivered to the destination host before it is discarded. A source address field 74 contains the address of the source host, and a destination address field 75 contains the address of the destination host. Under IPv4, these fields are each 32 bits long. Under IPv6, these fields will be 128 bits long. A more detailed example of the router 25 in FIG. 3, using the network configurations shown in FIG. 1, is given in FIG. 5.

Figure 5:
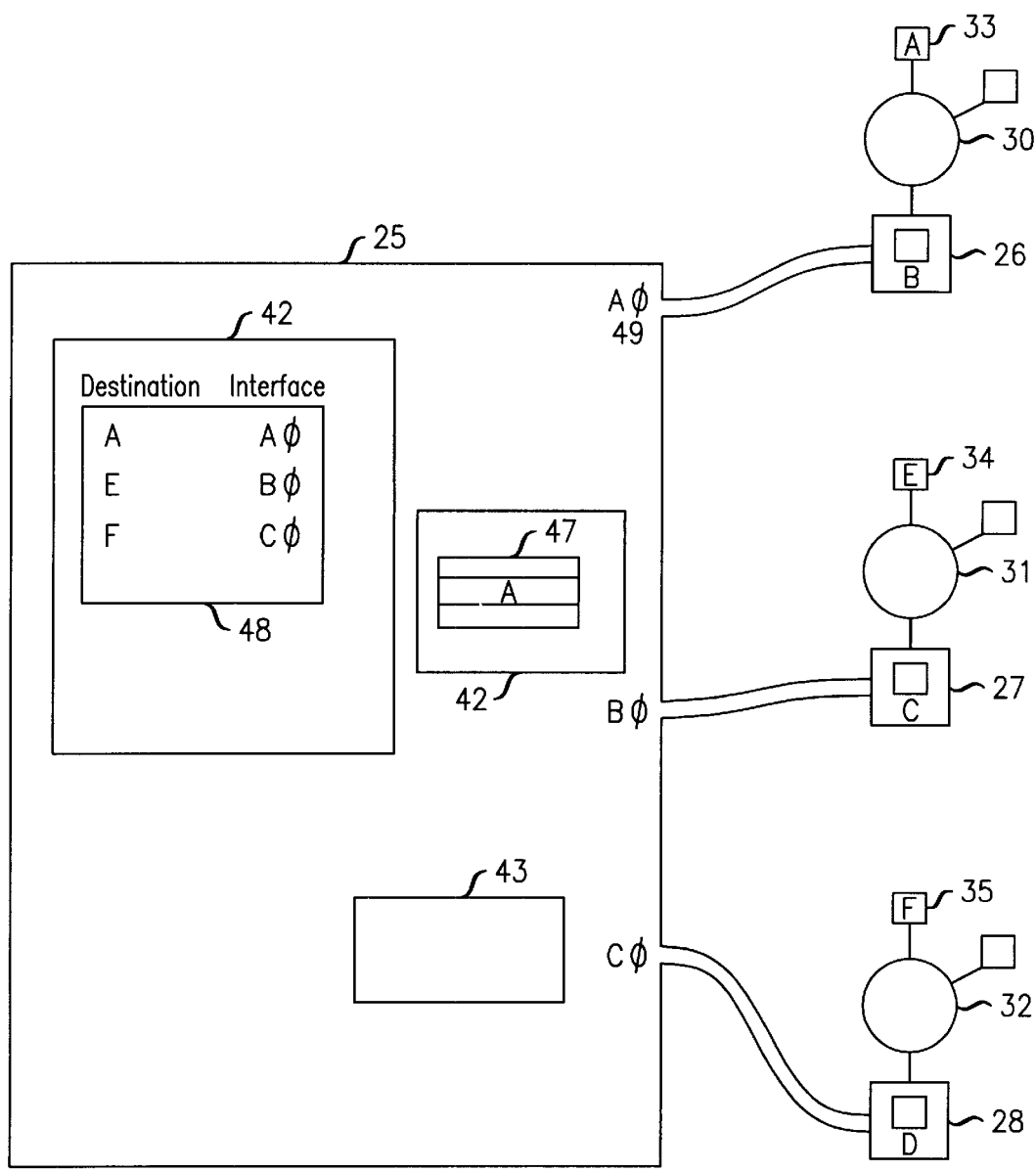
FIG. 5 is a drawing of the router, a routing table in the router, and the ports of the router.

FIG. 5 illustrates a router and how a routing table is used to determine how to route a data packet to the next router on a path. In this example, data packet 47 may be stored in the I/O buffer 42 of the router. The data packet has a destination address A, corresponding to destination host 33. After the data packet has been stored in the I/O buffer, the hardware search engine traverses the routing table 48 using a search tree as described below, comparing the destination address with entries in the routing table to determine the next router. Here, the destination address A corresponds to the first entry in the routing table for router B, with the corresponding port interface A0 49. The packet forwarder 43 then transmits the data packet to port A0 and the data packet is transmitted to router B 26. The data packet is then erased from the I/O buffer. Router B can then transmit the data packet to destination host A 33 on network 30.

Similarly, to route a data packet to host E 34, the data packet is routed to interface B0 and the data packet is transmitted to router C 27 which then forwards the data packet to host E. For a data packet destined for host F 35, the data packet may be routed to interface C0 and transmitted to router D 28 and then to host F. Now, the storage of a search tree in memory will be described.

In general, routing tables are stored as binary search trees in the memory of the router. Each node in the binary tree is stored in a memory location of the router and may correspond to a bit in the binary representation of the destination address as described below. If when traversing the binary tree, the decision at each node is based on a single bit in the destination address, the binary tree is called a radix tree. The leaves of the search tree may contain a physical address of the next router in the path. When a leaf is reached, all the nodes in the tree that were traversed equal the corresponding bits in the destination address. A "match" results and the data packet is forwarded to the router whose address is stored in the leaf. The destination address is sometimes called a "search key," but other data could also be used as search keys to traverse a radix tree.

For some networks, the complete destination address of the data packet may not used as a search key, but rather only a portion of the destination address is used. In general, only networks (e.g., a group of host computers linked together) are listed in a route table, although the route table may also contain host computer addresses. Each network may have a plurality of host computers connected to it and each host computer may have a unique address. Each unique host address may be contained within the network address since the network address has a prefix portion containing the network address and a second portion containing the unique host addresses. For example, the destination address of the host computer may be "10011". Thus, the address of the network that the host is connected to may be "100XX" where the last two bits, "XX" may have any value. Therefore, in searching for the network to send the data packet to, all the bits are used for the search, but only the upper three bits are compared. The irrelevant portion (e.g., the lower two bits in this example, can be masked out by, for example, logically ANDing it with 0 bits. The mask to determine which bits need to be compared to the destination address may be stored in a leaf node in a search tree.

Alternatively, instead of storing a physical address of a router in a leaf node, an index into a nexthop table may be stored in the leaf, and the nexthop table may have entries that correspond to router addresses. This may be beneficial, for example, when many leaf nodes contain the same router address and less memory is required to store a small index number at the multiple leaf nodes and a few large addresses may be stored in the nexthop table. The structure of a radix tree and its relation to a destination address are discussed in relation to FIG. 6. In addition, the use of a radix tree to search through a route table in accordance with the invention to store the address of a next router is now discussed in relation to FIGS. 6–7.

Figure 6:
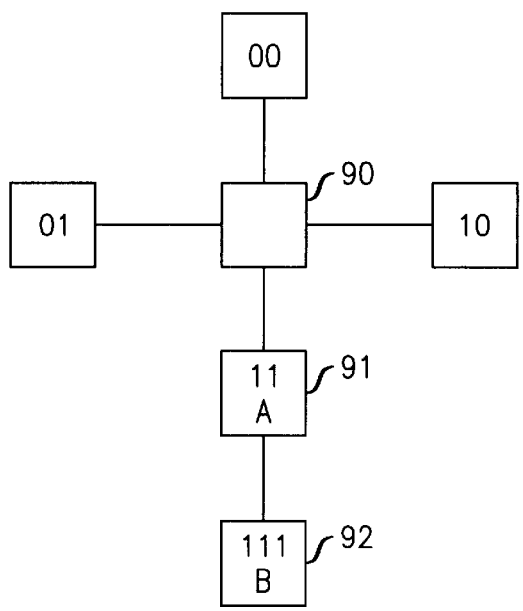
FIG. 6 is a diagram of an example of a network.
Figure 7:
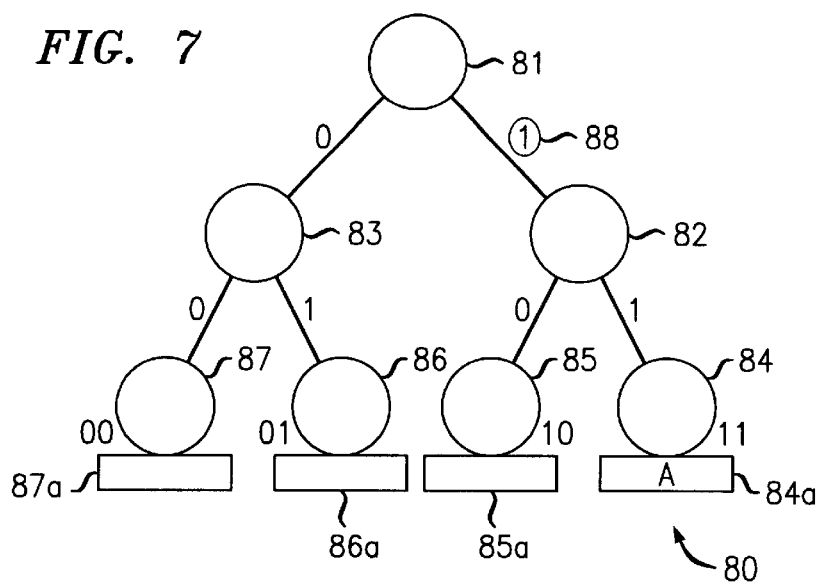
FIG. 7 is a binary tree for a node of the network shown in FIG. 6.

FIG. 7 is an example of a radix tree 80 corresponding to the system of interconnected routers shown in FIG. 6. For purposes of this example, assume that a data packet has arrived in a router 90 of FIG. 6 with a destination address of binary '111' which is the physical address for router B. The example is merely illustrative and typical destination addresses are much longer and the radix tree is more complex. The routing table stored as the search tree 80 for router 90, as shown in FIG. 6, is traversed to obtain the address of the next router in the path to which to forward the data packet. The radix tree is traversed using known methods and the right node of the search tree may be traversed when a "1" is encountered while a left node is traversed when a "0" is encountered or vice versa and the invention is not limited to either of these methods. In traversing this search tree, that may be a special compressed radix tree, a head node 81 is a starting point for the search. Comparing the first bit of the destination address (e.g., "1") to the decision bits 88 for the branches determines that a right branch is taken to a child node 82. Next, the second bit of the destination address is compared to the decision bits for the branches from node 82 and the right branch is taken to a node 84. The node 84 is a leaf node since there are no branches from this node. The leaf node contains an address 84A of the next router, which is "A" in this example.

Figure 8:
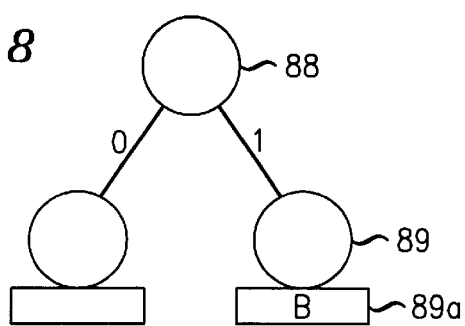
FIG. 8 is a second binary tree for a second node of the network shown in FIG. 6.

A similar search process may take place at router A. A radix tree for router A is shown in FIG. 8. The radix tree in router A may have a longer search, testing three bits in the destination address. For example, the search may begin at a head node 88 after testing two bits in the destination address (e.g. the data packet is at router A). At node 88, because the third bit in the destination address is a binary '1,' the right branch is taken to node 89 which is a leaf node. Because the address of router B is stored at node 89 the data packet is sent to router B. This process continues at each router until the data packet reaches its destination.

The time that it takes to traverse a radix tree and thus determine a next router in a path is one of the greatest sources of delay in transmitting data packets along a system of interconnected networks. Memory accesses account for much of this time because they take more clock cycles than most other operations executed by a microprocessor. Most systems and methods require at least two memory cycles to traverse a node in the radix tree. As described below with respect to FIG. 9, in accordance with the present invention, each node in a radix tree may be traversed in a single memory cycle which significantly reduces the search time. As discussed below, this is accomplished by providing a data structure that stores a decision bit for a node in the data structure above the node being traversed (i.e., its parent node). Thus, the time needed to traverse a radix tree can be cut approximately in half, doubling the amount of data packets that each router can transmit in a given time. Now, this data structure for each node of the radix tree will be described.

Figure 9:
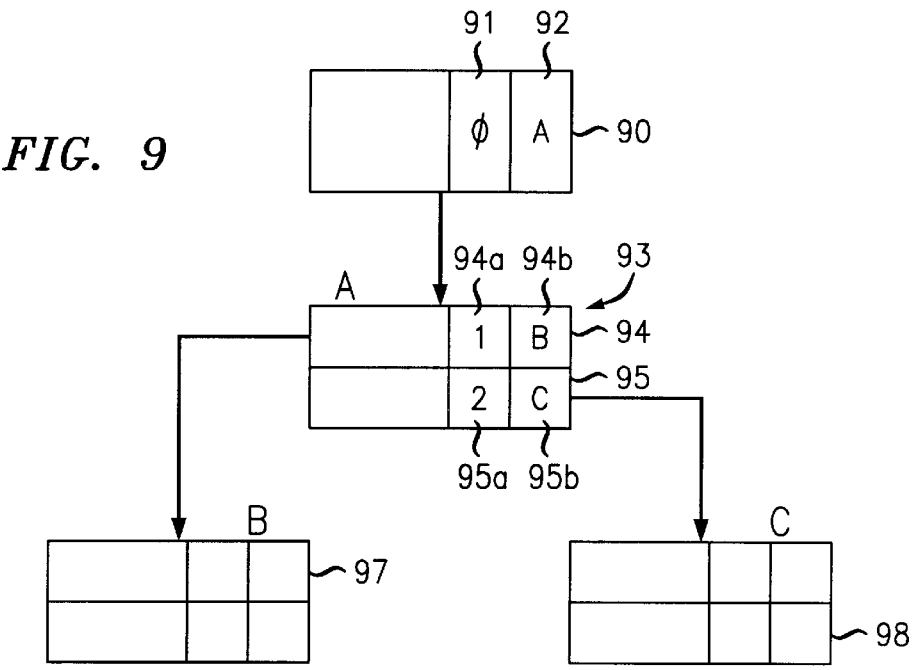
FIG. 9 is a diagram illustrating the data structure of nodes of a search tree in accordance with the present invention.

FIG. 9 shows the data structure for nodes of a radix tree in accordance with the invention. In particular, a head node 90, a child node 93, a left grandchild node 97, and a right grandchild node 98 of a radix tree having data structures in accordance with the present invention are shown connected together. To understand this radix tree, a description of the terminology used in connection with a search tree will be provided.

A search tree may have a plurality of nodes which contain data. A head node is the beginning of a search tree (e.g., there are no other nodes above the head node), while a parent node is any node in the search tree that has a node above it in the tree and also has nodes connected below it in the tree. The nodes connected to a parent node are child nodes. A leaf node is a node that has a parent, but does not have any child nodes so that it is an end point of the tree. In this terminology, a node in the tree may be both parent node with respect to its associated child nodes, but may also be a child node with respect to its parent node.

As shown in FIG. 9, the head node 90 may include a bit position field 91 and a child pointer field 92. The bit position field indicates which bit position of a destination address is being compared to determine which child node is the next node in the radix tree to traverse. The child has a left node descriptor 94 and a right node descriptor 95. The left node descriptor has a bit position field 94a and a child pointer field 94b, which stores the address of the left grandchild 97. The right node descriptor 95 has a bit position field 95a and a child pointer field 95b, which stores the address of the right grandchild 98. The bit position fields may contain information that is used to determine which bit positions in the destination address are compared to which bit positions in the search key. As shown, each node has a bit position field as well as the pointer for each branch in a unified data structure so that a single memory access obtains all of this information. In addition, each node contains the decision bits for the nodes attached to it so that, for example, node 93 contains bit position fields 94a, 95a for nodes 97, 98.

The radix tree in FIG. 9 may be searched using the binary search key '01' as follows (in this example, bits are numbered from left to right starting with the 0th bit), assuming that a '1' bit requires that a right branch is taken. First, the contents of the bit position field and child address field in head node 90 are read from the set of registers 61, as shown in FIG. 3, in one clock cycle. The 0th bit of the search key is the decision bit and the child address is the address of node A. Therefore, because the 0th bit is '0,' and thus corresponds to taking the left branch, the search engine will load the left node descriptor 94 in node A from the route table memory into the set of registers. Once the left descriptor 94 in node A is loaded, the hardware search engine will process the 1 st bit in the search key, a '1', and load the right node in node B. Traversing each node accordingly takes only one memory access since information indicating what to do at a node is read before the node is reached. Now, the physical data structures for the nodes of a tree in accordance with the invention will be described.

FIGS. 10–13 show several embodiments of the data structures that can be used for a head node (FIG. 10), a node (FIG. 11), a leaf (FIG. 12), and a node with an attached route (FIG. 13). Each of these data structures is discussed in turn, and will be discussed in more detail in relation to FIGS. 14 and 16 below. Each of these data structures permit a single memory access to retrieve all of the information to traverse a node of a search tree. Now, each data structure will be described.

FIG. 10 shows a head node 100 having an attached route (ar) field 101, a node index field 102, a leaf (lf) field 103, a null pointer (np) field 104, and a bit position field 105. The ar field may indicate whether the node pointed to by the node index field (e.g., a child node) has an attached route. An attached route is a node in a tree that may contain an address of a router, but might not provide the best router in the path. The node may be stored in a stack, for example, for later processing. Then, if a leaf that is finally reached does not contain a best match route, the node with the attached route may be retrieved from the stack and processed to determine whether it contains a valid router in the path.

The node index field of a head node may contain the address of a node which is a child of the head node. The lf field may indicate whether the node pointed to by the node index field is a node or a leaf. The np field may indicate whether the node pointed to by the node index field (e.g., a child) has a child or is null. Since, for example, a node cannot have a child that is both a leaf and null, certain combinations of bits may indicate that the node contains incorrect data and that an error has occurred. In some embodiments of the present invention, a '1' bit in the leaf field indicates that the child of the current node is a leaf, and a '1' bit in the np field indicates that the node does not have a child. Thus, if all the bits in the node are '1' (i.e., if both the np field and lf field contain '1'), then an error has occurred. The bit position field may indicate which bit or bits is or are examined in the search key to determine whether the search engine should read the left or the right node descriptor of the child. In some embodiments the node descriptor is 32 bits long. Now, the node data structure will be described.

FIG. 11 shows a node data structure 110 having a right node descriptor 111 and a left node descriptor 112. The fields in each node descriptor are similar to the corresponding fields in the head node shown in FIG. 10. Thus, in each child node, the address of both the right and left nodes are stored as well as the bit position fields for the right and left nodes so that one memory access may retrieve this information. In a typical radix tree, one memory access retrieves the bit position to compare to the destination address and a second memory access retrieves a pointer to the node determined by the comparison. Thus, two memory accesses are required to search each node in a typical radix tree.

FIG. 12 shows a leaf node data structure 115. The leaf may have a mask length field 116, a flags field 117 which may be used by the software to make decisions after a lookup in the routing table, a nexthop_index_handle field 118 which may store an index into a nexthop table, and a field for the most significant word of the prefix 119 (e.g., the physical address of a router stored in a leaf that the search key may be compared to). For the IPv4 protocol, only this single word is required to store the address of the router because the addresses are 32 bits long whereas, for the IPv6 protocol, four words would be required and the leaf node would contain additional fields for storing the address of the router. The nexthop_index_handle provides an index into a nexthop table to determine the physical address of the next router that a data packet is sent to.

FIG. 13 shows a data structure 125 for a node with an attached route. This node is the combination of a node and a leaf since the node with the attached route has child nodes, but also has an attached route which is an address of a next router to which the data packet is sent similar to a leaf node. The node may have a right node descriptor 126, a left node descriptor 127, as described above, and an attached route block 128. The attached route block may contain a mask length field for the route 129, a flags field 130, a nexthop_index_handle field 131, and a prefix field 132, as described above. Now, a method for searching a route table in accordance with the invention will be described.

Figure 14A:
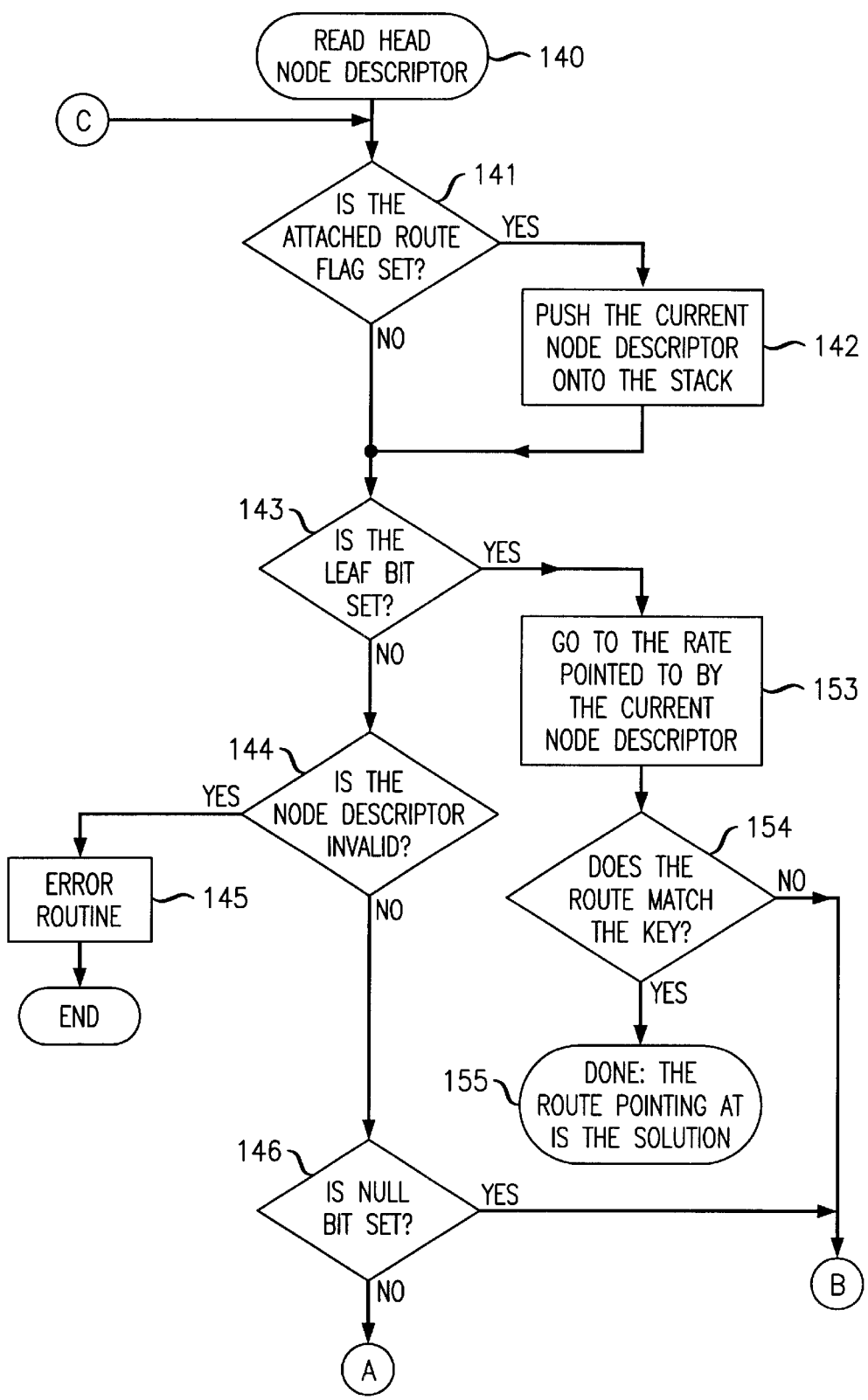
FIGS. 14A and 14B illustrate a flowchart for the method of traversing a routing table stored as a search tree in accordance with the present invention.
Figure 14B:
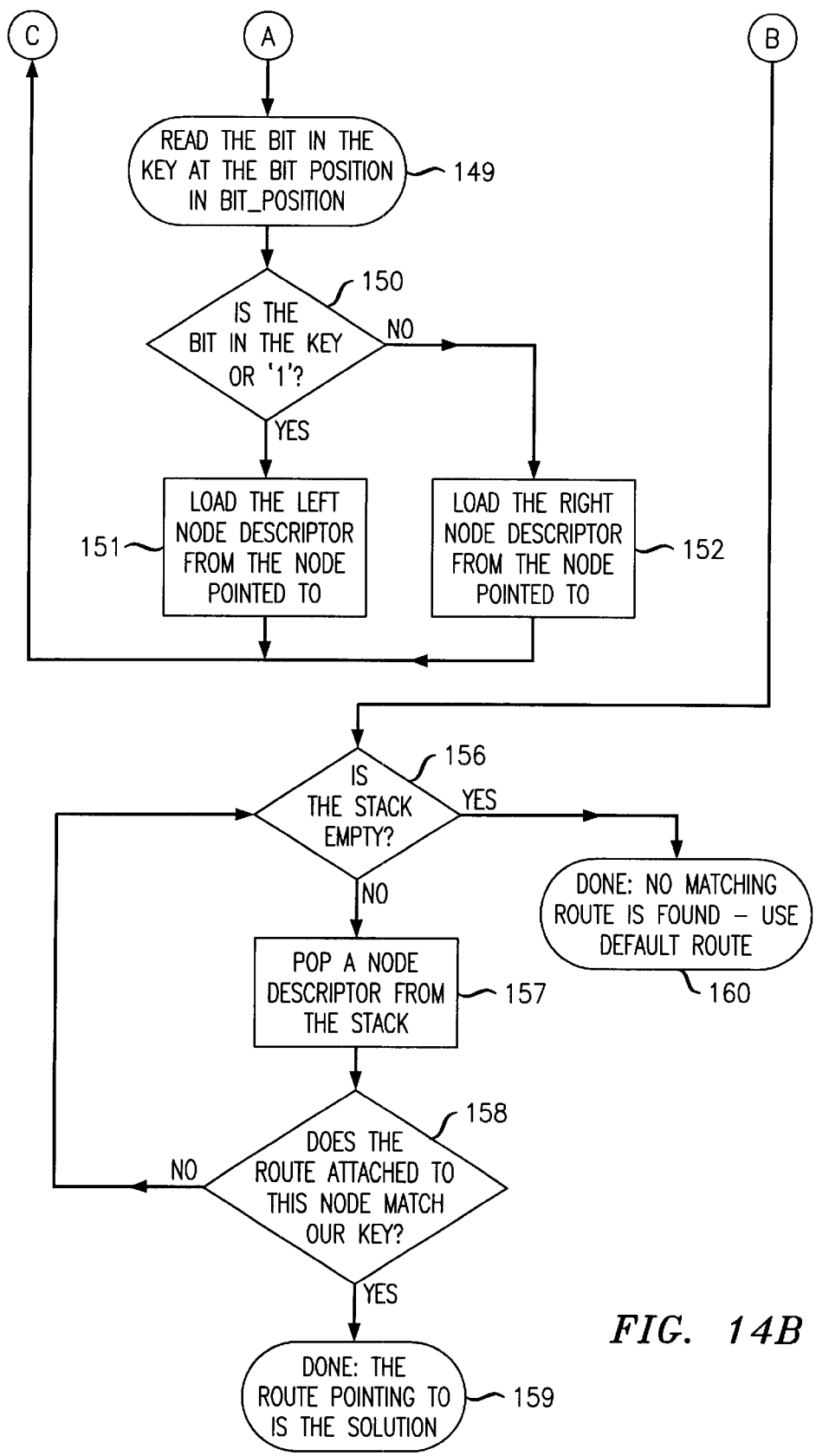

FIGS. 14A and 14B illustrate a method for searching a search tree, such as a special radix tree, using the data structures of FIG. 10–13 in accordance with the invention. In step 140, the head node of the search tree is loaded from the set of registers. The various data fields in the current node are then analyzed. In particular, in step 141, the hardware search engine determines if the attached route (ar) flag in the head node is set. If the ar bit is set, then in step 142, the hardware search engine pushes the head node descriptor onto a route stack so that it may be used for later processing as described below. Next, in step 143, the hardware search engine determines if the leaf bit (lf) of the head node is set. If the leaf node is not set (e.g., the head node is not a leaf), then in step 144, the hardware search engine determines if the node descriptor, which points to the child node of the head node, is invalid. As described above, the node descriptor may be invalid if any more than one of the lf, np or ar bits are set. If the child node descriptor is invalid, then in step 145, an error routine is executed and an error message is generated. If the node descriptor is valid, then in step 146, the hardware search engine determines if the null bit of the node descriptor is set. If the null bit is set, then control passes to steps 156–160 as described below. If the null bit is not set, then in step 149, the hardware search engine reads the bits in the search key corresponding to the bit position field in the head node and determines, in step 150, if the bit in the search key is "1". If the bit is "1", then the data structure for the left child node of the current node is loaded from route table memory into a register in step 151. Or, if the bit is "0", then the data structure for the right child node of the current node is loaded from route table memory into a register in step 152. After each of the loading steps, the method loops back to step 141 and the processing occurs again for the current node of the search tree being traversed, which may be the right or left child node of the head node. In this manner, the data in each node of the search tree traversed is processed. The above steps 141–152 may occur simultaneously such that the bits of the current node are all processed simultaneously.

If the leaf bit of the head node or the current node being processed is set, as tested in step 143, then in step 153, the address of the route pointed to by the current node descriptor is determined. The hardware search engine may then determine if the address of the route matches the search key in step 154. If the route address in the leaf node matches the search key, then the best match route has been identified in step 155 and the traversal of the search tree is complete. If the route address in the leaf node does not match the search key, then the hardware search engine may determine if the route stack is empty in step 156. If the route stack is empty, then in step 160, the hardware search engine indicates that no best match is found and the data packet may be sent along a default route assigned to it by the router. If the stack is not empty, then in step 157, the top node descriptor on the stack is read and the hardware search engine, in step 157, determines if the route attached to the node descriptor matches the search key in step 158. If the attached route does not match the search key, then the stack is tested to determine if it is empty back in step 156 and the same analysis of the next attached route in the stack occurs. If the attached route does match the search key, then in step 159, the hardware search engine determines that the best match has been found and the search method is completed. Now, an example of a network of routers and a corresponding radix tree for a particular router that is searched to determine the next router in accordance with the present invention will be described.

Figure 15:
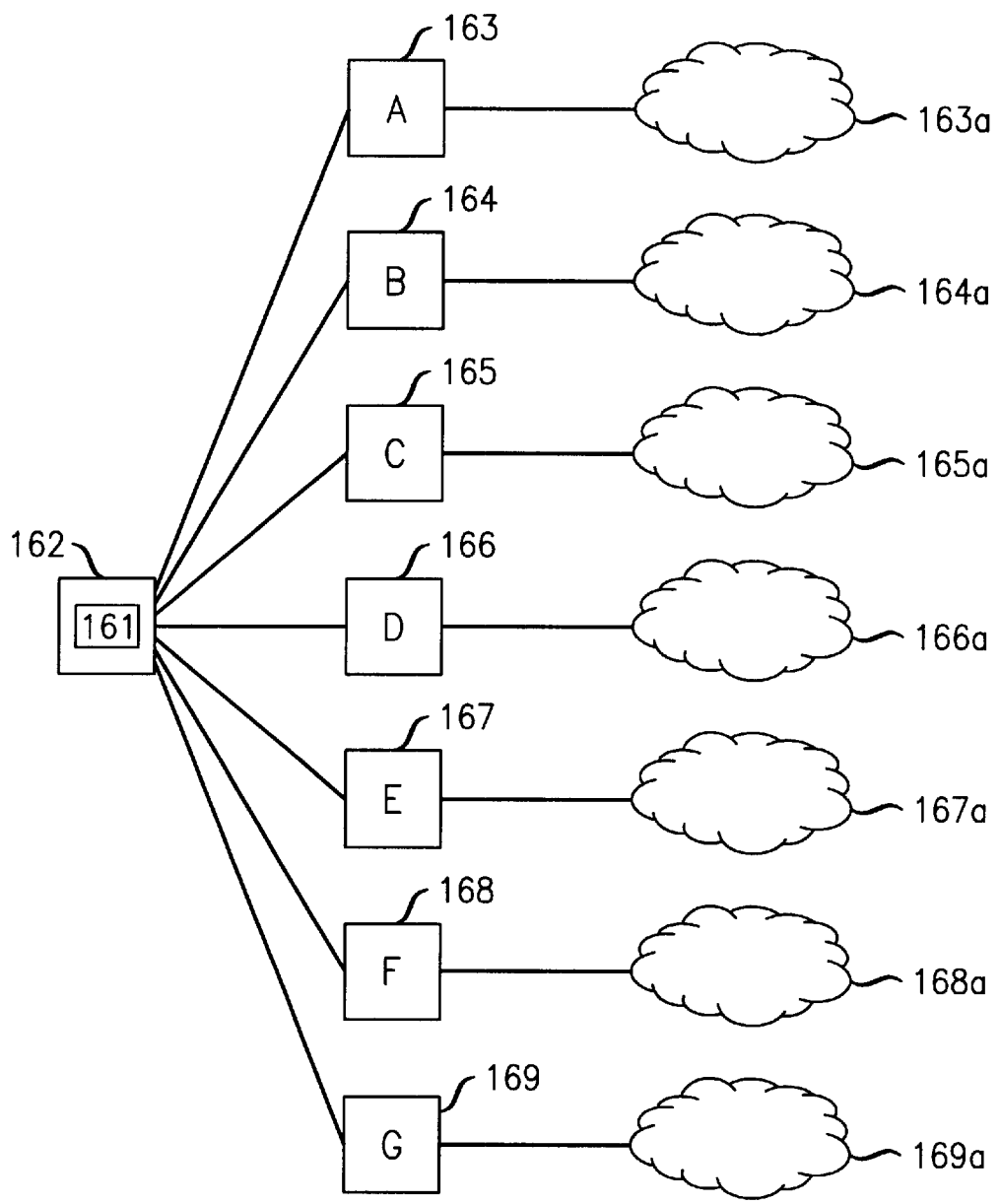
FIG. 15 is a drawing of an example of a router with a plurality of networks attached to the router.
Figure 16:
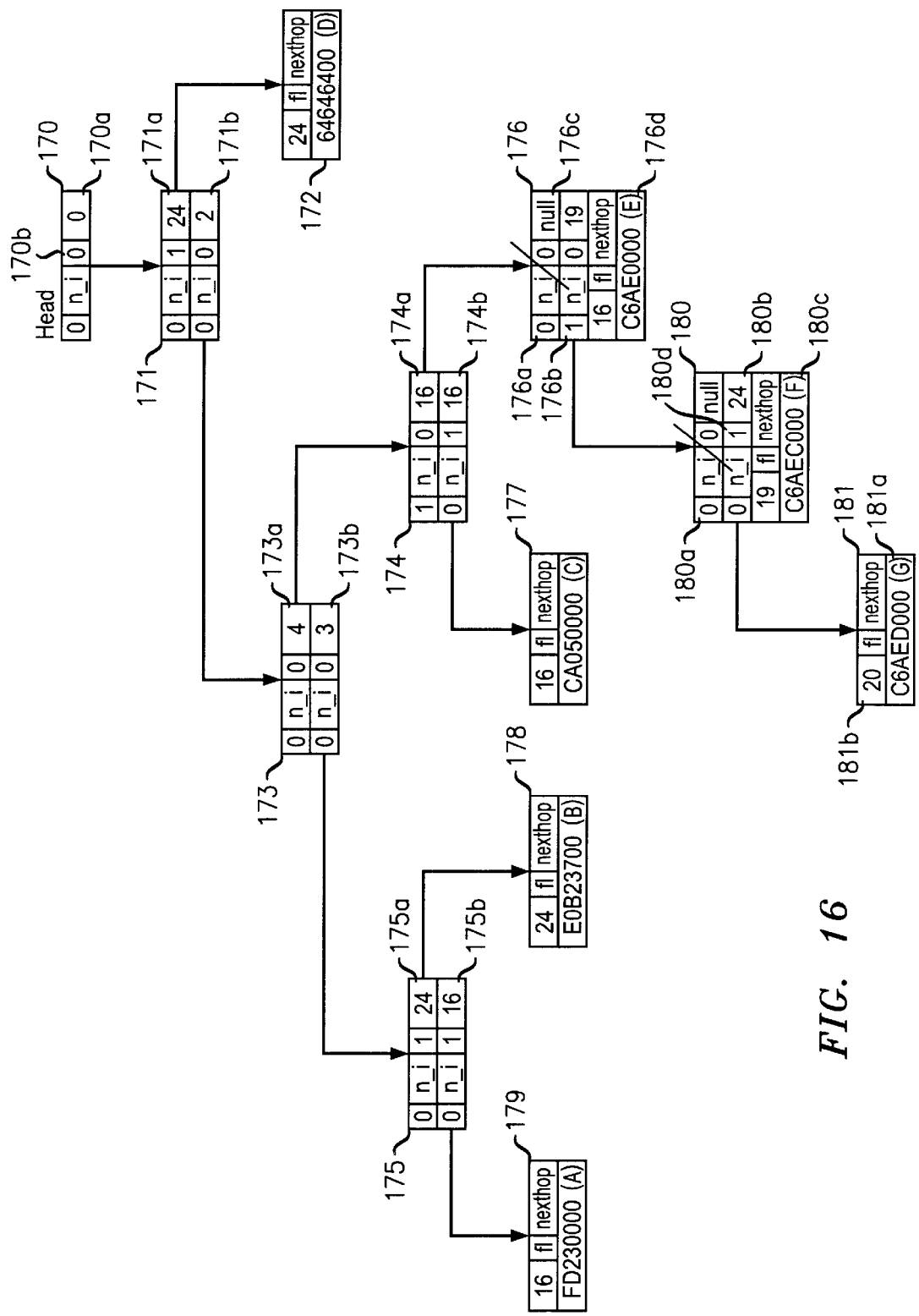
FIG. 16 is a routing table in accordance with the present invention stored as a radix tree for the router and attached networks shown in FIG. 15.

FIG. 15 illustrates a system of networks and routers, and FIG. 16 illustrates a portion of a corresponding radix search tree for a router within the network. The data structures of FIGS. 10–13 will be used to traverse this tree using a binary destination address (i.e., search key) of 1100 0110 1010 1110 1101 1111 1111 0000, in hexadecimal notation, 0xC6AEDFF0. At each step, the hardware search engine may perform the search method described above and traverse each node of the search tree in accordance with the present invention using only a single memory access. In this example, a '0' in the leaf field indicates that the node is not a leaf. As shown in FIG. 15, a data packet 161 may be at a router 162. The router 162 may be connected to a plurality of other routers 163–169 and each of the other routers is attached to another network 163a–169a. FIG. 16 shows a special compressed radix search tree for the router 162 in which each leaf node of the radix tree contains a physical address for a corresponding router 163–169 in the network. For example, leaf node 179 contains an address for router A 163 while leaf node 181 contains an address for router G 169. In this example, the data packet has a destination address of a host computer attached to network 169a which is in turn connected to router G 169 and an example of a search performed by a hardware search engine in accordance with the invention in router 162 will be described.

The route table search begins at a head node 170 that has a bit position field 170a equal to '0' and a leaf bit 170b equal to '0'. Therefore, based on these bits, the search engine compares the 0th bit of the search key to the head node and determines that the child node of the head node is not a leaf node. The 0th bit of the search key is '1' and the hardware search engine determines that the right node descriptor 171b of a child node 171 is the next node that is retrieved and traversed. Thus, the parent node (e.g., the node above another node in the search tree) has information to indicate whether to choose the left or right child node so that only a single memory access is necessary to traverse each node of the tree. Similarly, once the node 171b is retrieved, the hardware search engine already has the information to determine whether to traverse to a left node 173a or a right node 173b of child node 173 which is below node 171 in the search tree as well as the pointers to each of these nodes in a single memory access. In this example, the leaf bit of node description 171b contains a 0, so this node's child is not a leaf. The bit position in node 171b is 2, and the 2nd bit in the search key is '0,' so the left node descriptor 173a of node 173 is the next node that is retrieved based on the pointer in the node descriptor.

When the node 173a is retrieved, due to the node descriptor, the fourth bit position of the search key, which is "0", is read and that determines that a left node descriptor 174a of node 174 is the next node descriptor to be processed and node 174a is retrieved based on the pointer contained in the node descriptor. The hardware search engine retrieves the node 174a and due to the bit position field in the node descriptor, the sixteenth bit position of the search key, which is "1", is retrieved indicating that a right node descriptor 176b of the child node 176 will be processed next and node 176b is retrieved. Note that the left node descriptor 176a contains a null np field 176c indicating that the descriptor does not have any node attached to it. The node 176 also has an attached route 176d which is stored on the route stack, as described above.

When node 176 and the right node descriptor 176b are retrieved, the nineteenth bit of the destination address, which is "1", is retrieved which indicates that a right node descriptor 180b of node 180 is the next node descriptor to be processed and node 180b is retrieved and traversed. As above, node 180 has an attached route 180c which is stored in the route stack. Finally, after retrieving the right node 180b, the leaf node 180d of the node descriptor is set indicating to the hardware search engine that the child node is a leaf 181 and contains a router address 181a. Since this is a leaf node, the route address, which is C6AED000 and corresponds to router G 169, is read and compared to the search key. A mask length field 181b, which holds a value of "20" indicates that the first twenty bits of the destination address are compared to the route address and a best route match occurs when the first twenty bits of each match. The mask field value of 20 corresponds to a mask whose first 20 bits are 1 (e.g., 0xFFFFF000 in hexadecimal). Logically ANDing the mask with the search key results in a match since the result, 0xC6AED000, equals the route address. Accordingly, there is a match, and the data packet is transmitted to the router with the address 0xC6AED000 (parenthetical letters show the corresponding router in the network shown in FIG. 15, here "G"). As described above, the lower twelve bits of the destination address which is equal to FF0 may be the corresponding host computer address within the network whose address is C6AED000.

If the best match is not located, then the attached routes placed on the route stack may be reviewed to determine if any of those routes may be useful. For example, if the address in the leaf 181 did not match the destination address, the route address in node 176, which is C6AE0000, may match the destination address and provide the data packet with an alternate route.

The route stack and the attached routes provide an advantage over conventional search tree systems. In a conventional Patricia search tree, when a non-matching address is located in a leaf node, the router must go back up the nodes of the Patricia tree and try to determine another route for the data packet. However, in accordance with the invention, each node may have an attached route which stores alternative routes so that the route stack stores each of these other routes during the downwards traversal of the search tree so that an alternate route may be located without having to traverse any nodes of the search tree again which reduces the time to find a alternate route.

While the foregoing has been with reference to a particular embodiment of the invention, it will be appreciated by those skilled in the art that changes in this embodiment may be made without departing from the principles and spirit of the invention, the scope of which is defined by the appended claims.

We claim:

1. An apparatus for determining a path through a network between a source location and a destination location, the path having a plurality of intermediate locations between the source location and the destination location, the source location and each intermediate location having an address and having a memory for storing a routing table used to determine the address of a next location in a dynamically varying path between the source location and the destination location, the routing table being stored as a search tree having parent nodes and child nodes, the search tree terminating in a plurality of leaf nodes, the parent node and child node providing information relating to the address of a leaf node which stores information relating to the address of a next location in the predetermined path, the apparatus comprising:

a memory for storing routing table, each node of the search tree corresponding to a portion of the address of the destination location, such that a sequence of nodes traversed in traveling from a parent node to a child node relates to corresponding sequence of bits in the destination address;

means for processing, in one memory cycle, information at a parent node of the search tree to reach a child node that is in the branch from the parent node to the leaf storing address information related to a next location in the predetermined path, the information at the parent node comprising a decision bit and an address of a child node, the child node comprising a left node descriptor and a right node descriptor each storing a decision bit and a address of a next child node in the branch from the parent node to the leaf, the decision bit in the parent node used to determine whether the address stored in the right node descriptor or the left node descriptor of the child node is the address of the node in the branch between the child node and the leaf; and means for processing information stored in the leaf to determine the address of a next location.

2. The apparatus of claim 1, wherein said search tree comprises a compressed radix tree.

3. The apparatus of claim 2, wherein the means for processing in one memory cycle information at a parent node of the radix tree to reach the leaf containing information used to determine the address of a next location, comprises:

a first engine for processing the decision bit stored in a bit position field of a parent node to determine whether the next child node is defined by the address stored in the right node descriptor or the left node descriptor of the child node, the next child node being in the branch between the parent node and the leaf; and a second engine for receiving instructions from the first engine for accessing node descriptor information in the memory and information stored in the leaf.

4. The apparatus of claim 2, further comprising a microprocessor for processing information in a head node of the radix tree and for transmitting a start signal to the first engine to execute a sequence of instructions to determine the address of a next location.

5. The apparatus of claim 1, further comprising a route stack for storing the address of a parent node having an attached route, wherein when the means for processing in one memory cycle information at the parent node determines that an attached route field in the parent node indicates that the parent node has an attached route that may contain information relating to an alternate next location, the address of the parent node is stored on the route stack so that if the information stored in the leaf does not contain an address of next in the path between the source location and the destination location, the parent node having an attached route can be processed to determine the address of an alternate next location.

6. The apparatus of claim 1, wherein the means for processing information stored in the leaf comprises a bit mask for masking bits in the address of the destination location and means for comparing a result of so masking to the address information related to the next intermediate location.

7. The apparatus of claim 1, wherein the address information related to a destination location conforms to one of Internet Protocol version 4 and Internet Protocol version 6.

8. The apparatus of claim 1, wherein the information related to a next location is an index into a nexthop table correlates the indices in the nexthop table to addresses of locations.

9. A method for determining a path through a network between a source location and a destination location, the path having a plurality of intermediate locations between the source location and the destination location, each location having an address and having a memory for storing a routing table used to determine the address of a next location in a dynamically varying path between the source location and the destination location, the routing table being stored as a radix tree having parent nodes and child nodes, the radix tree terminating in leaves, the parent nodes and child nodes providing information relating to the address of a leaf which stores information relating to the address of a next location in the predetermined path, the method comprising:

(a) processing in one memory cycle information at a parent node of the radix tree to reach a child node that is in the branch from the parent node to the leaf storing address information related to a next location in the dynamically varying path, each node of the radix tree corresponding to a portion of the address of the destination location, such that the sequence of nodes traversed in traveling from a parent node to a child node relates to a corresponding sequence of bits in the destination address, the information at the parent node comprising a decision bit and an address of a child node, the child node comprising a left node descriptor and right node descriptor each storing a decision bit and an address of a next child node in the branch from the parent node to the leaf, the decision bit in the parent node used to determine whether the address stored in the right node descriptor or the left node descriptor is the address of the next node in the branch between a child node and the leaf;

(b) repeating step (a) until the child node is a leaf; and (c) processing information stored in the leaf to determine the address of a next location.

10. The method of claim 9, further comprising:

storing the address of a parent node if an attached field in the parent node indicates that the parent node has an attached route that may contain information relating to an alternate next location;

retrieving the address of the parent node stored on the route stack if the information stored in the leaf does not contain a valid address of a next location in the path between the source location and the destination location; and processing the address of the parent node on the route stack having an attached router to determine the address of an alternate next location.

11. The method of claim 9, wherein the information related to a next location is an index into a nexthop table which correlates the indices in the nexthop table to addresses of locations.

12. A memory for storing data for access by an application program being executed on a data processing system for determining a next location in a network between a source location and a destination location, the data being stored in a search tree having a plurality of nodes in a hierarchical relationship, the nodes arranged in a first, second and third levels, the first, second and third levels comprising:

a first level data structure, accessed in one memory cycle, representing a first level node of the search tree including a pointer field to a node in the second level of the search tree, a bit position field for determining one of a right branch and a left branch in the second level of the search tree and an error checking field for determining that the other first level fields most likely contain valid data;

a second level the data structure, representing a second level node of the search tree including a right branch descriptor and a left branch descriptor, each accessed in one memory cycle, the right branch descriptor and left branch descriptor each having a pointer field to a node in the third level of the search tree, a bit position field for determining one of a right branch and a left branch from the node in the third level of the search tree, and an error checking field for determining that the other second level fields most likely contain valid data; and a third level data structure, representing a third level node of the search tree that can function as the second level data structure.

13. The memory of claim 12, wherein each second level node contains a node descriptor field having a bit position field and a pointer field, the pointer field storing the address of a next third level node in the branch from the second level node and the bit position field used for specifying a decision bit that determines which bit in a search key is used to determine the next third level node taken on the branch from a second level node to a third level node.

14. The memory of claim 13, wherein the decision bit in each node corresponds to one bit of an address of the destination location, and wherein the nodes traversed on the path from a first level node to a third level node correspond to a sequence of bits comprising a portion of the destination address.

15. The memory of claim 14, wherein a lowest level node in the tree comprises a leaf node that contains information relating to the address of the next location.

16. The memory of claim 12, wherein a node that is not a leaf node further comprises an address for an alternate route from the source location to the destination location.

* * * * *